(12) United States Patent
Melone (10) Patent No.: US 7,427,247 B2
(45) Date of Patent: Sep. 23, 2008

(54) MOWER INCORPORATING A MULE DRIVE

(75) Inventor: Mark J. Melone, Rome, NY (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 625 days.

(21) Appl. No.: 10/903,905

(22) Filed: Jul. 30, 2004

(65) Prior Publication Data

US 2006/0025255 A1 Feb. 2, 2006

(51) Int. Cl.
*F16H 7/00* (2006.01)
*A01D 69/00* (2006.01)

(52) U.S. Cl. .......................... 474/62; 56/11.6

(58) Field of Classification Search ............. 474/62–63, 474/84, 87, 117, 133, 134–135; 56/6, 10.8, 56/11.16, 11.3, 11.6, 13.5, 15.2, 15.8, 15.9, 56/16.3; 74/655 GB
See application file for complete search history.

(56) References Cited

U.S. PATENT DOCUMENTS

| 423,046 A | 3/1890 | Gregg |
| 2,522,148 A | 9/1950 | Traxler |
| 2,872,831 A * | 2/1959 | Wood .......................... 474/62 |
| 3,550,364 A | 12/1970 | Musgrave |
| 3,613,462 A * | 10/1971 | Stibbe ........................ 74/15.63 |
| 3,709,062 A | 1/1973 | Draege |
| 3,757,596 A | 9/1973 | McCanse |
| 3,919,893 A | 11/1975 | Boehm et al. |
| 4,102,114 A * | 7/1978 | Estes et al. ................... 56/15.2 |
| 4,187,924 A | 2/1980 | Deschamps |
| 4,213,215 A * | 7/1980 | Hall ................................ 7/152 |
| 4,231,215 A * | 11/1980 | Klas ............................. 56/11.6 |
| 4,317,325 A | 3/1982 | Marto |
| 4,325,210 A | 4/1982 | Marto |
| 4,395,865 A | 8/1983 | Davis, Jr. et al. |
| 4,453,374 A * | 6/1984 | Kuhn ......................... 56/320.1 |
| 4,454,706 A | 6/1984 | Geeck, III |
| 4,813,215 A * | 3/1989 | Chase et al. ................. 56/11.6 |
| 4,901,507 A * | 2/1990 | Cracraft ........................... 56/6 |
| 4,925,437 A | 5/1990 | Suzuki et al. |
| 5,249,411 A * | 10/1993 | Hake .......................... 56/11.6 |
| 5,445,572 A * | 8/1995 | Parker ......................... 74/650 |
| 5,865,020 A | 2/1999 | Busboom et al. |
| 6,651,413 B2 | 11/2003 | Papke |

FOREIGN PATENT DOCUMENTS

GB 2064061 6/1981
JP 04244643 A * 9/1992

* cited by examiner

*Primary Examiner*—Marcus Charles
(74) *Attorney, Agent, or Firm*—Greenberg Traurig, LLP (57) ABSTRACT

A mule drive for use with a mower having a substantially horizontally-disposed output shaft is provided. The mower includes a cutter deck having at least one Rota table cutter driven by a substantially vertically-disposed driven shaft. The mule drive includes a first idler pulley coupled to the mower for rotation about a first axis substantially transverse to the output shaft and the driven shaft, a second idler pulley coupled to the cutter deck for rotation about a second axis substantially parallel to the first axis, a third idler pulley coupled to the cutter deck for rotation about a third axis substantially parallel to the second axis, a fourth idler pulley coupled to the frame for rotation about a fourth axis substantially transverse to the output shaft and the driven shaft, and a continuous belt.

34 Claims, 8 Drawing Sheets

MOWER INCORPORATING A MULE DRIVE

FIELD OF THE INVENTION

This invention relates generally to mowers, and more particularly to mowers incorporating mule drives.

BACKGROUND OF THE INVENTION

Mule drives are typically used in mowers to transmit power from engines having substantially horizontal output shafts to one or more cutters having substantially vertical driven shafts. Such mule drives may include a pair of idler pulleys located between an output pulley coupled to the horizontal output shaft of the engine and a driven pulley coupled to the cutter. The idler pulleys usually rotate about respective axes that are transverse to the horizontal output shaft. As a result, the idler pulleys may re-direct a continuous belt from a substantially vertical belt orientation to a substantially horizontal belt orientation.

SUMMARY OF THE INVENTION

Some embodiments of the present invention provide a mule drive for use with a mower having a substantially horizontally-disposed output shaft and an output pulley coupled to the output shaft. The mower includes a cutter deck having at least one rotatable cutter driven by a substantially vertically-disposed driven shaft coupled to a driven pulley. The mule drive includes a first idler pulley coupled to the mower for rotation about a first axis substantially transverse to the output shaft and the driven shaft, a second idler pulley coupled to the cutter deck for rotation about a second axis substantially parallel to the first axis, a third idler pulley coupled to the cutter deck for rotation about a third axis substantially parallel to the second axis, a fourth idler pulley coupled to the frame for rotation about a fourth axis substantially transverse to the output shaft and the driven shaft, and a continuous belt coupling the output pulley, the idler pulleys, and the driven pulley.

Other embodiments of the present invention provide a mule drive for use with a mower having a substantially horizontally-disposed output shaft and an output pulley coupled to the output shaft. The mower includes a cutter deck having at least one rotatable cutter driven by a substantially vertically-disposed driven shaft coupled to a driven pulley. The mule drive includes a continuous belt drivably coupling the driven pulley to the output pulley. The belt defines a belt axis along a direction of travel of the belt. The mule drive also includes a first idler pulley coupled to the mower for guiding the belt from the output pulley toward the driven pulley. The first idler pulley redirects the belt from a substantially vertical orientation to a substantially horizontal orientation and at least partially twists the belt about the belt axis between the output pulley and the first idler pulley. The mule drive further includes a second idler pulley coupled to the cutter deck for guiding the belt from the first idler pulley toward the driven pulley. The belt maintains a substantially constant orientation about the belt axis between the first and second idler pulleys and at least partially twists about the belt axis between the second idler pulley and the driven pulley. The mule drive also includes a third idler pulley coupled to the cutter deck for guiding the belt from the driven pulley toward the output pulley. The belt at least partially twists about the belt axis between the driven pulley and the third idler pulley. The mule drive further includes a fourth idler pulley coupled to the mower for guiding the belt from the third idler pulley toward the output pulley. The fourth idler pulley redirects the belt from a substantially horizontal orientation to a substantially vertical orientation. The belt maintains a substantially constant orientation about the belt axis between the third and fourth idler pulleys and at least partially twists about the belt axis between the fourth idler pulley and the output pulley.

Yet other embodiments of the present invention provide a mower including a frame defining a longitudinal axis, an engine coupled to the frame and having an output shaft rotatable about an output axis substantially parallel with the longitudinal axis, an output pulley coupled to the output shaft for rotation about the output axis, a cutter deck having at least one rotatable cutter, a driven pulley drivably coupled to the cutter for rotation about a substantially vertical axis substantially transverse to the output axis, and a mule drive drivably coupling the driven pulley and the output pulley. The mule drive includes a first idler pulley coupled to the frame for rotation about a first axis substantially transverse to the output axis and the vertical axis, a second idler pulley coupled to the cutter deck for rotation about a second axis substantially parallel to the first axis, a third idler pulley coupled to the cutter deck for rotation about a third axis substantially parallel to the second axis, a fourth idler pulley coupled to the frame for rotation about a fourth axis substantially transverse to the output axis and the vertical axis, and a continuous belt coupling the output pulley, the idler pulleys, and the driven pulley.

Other embodiments, features, and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Before any features of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

Figure 1:
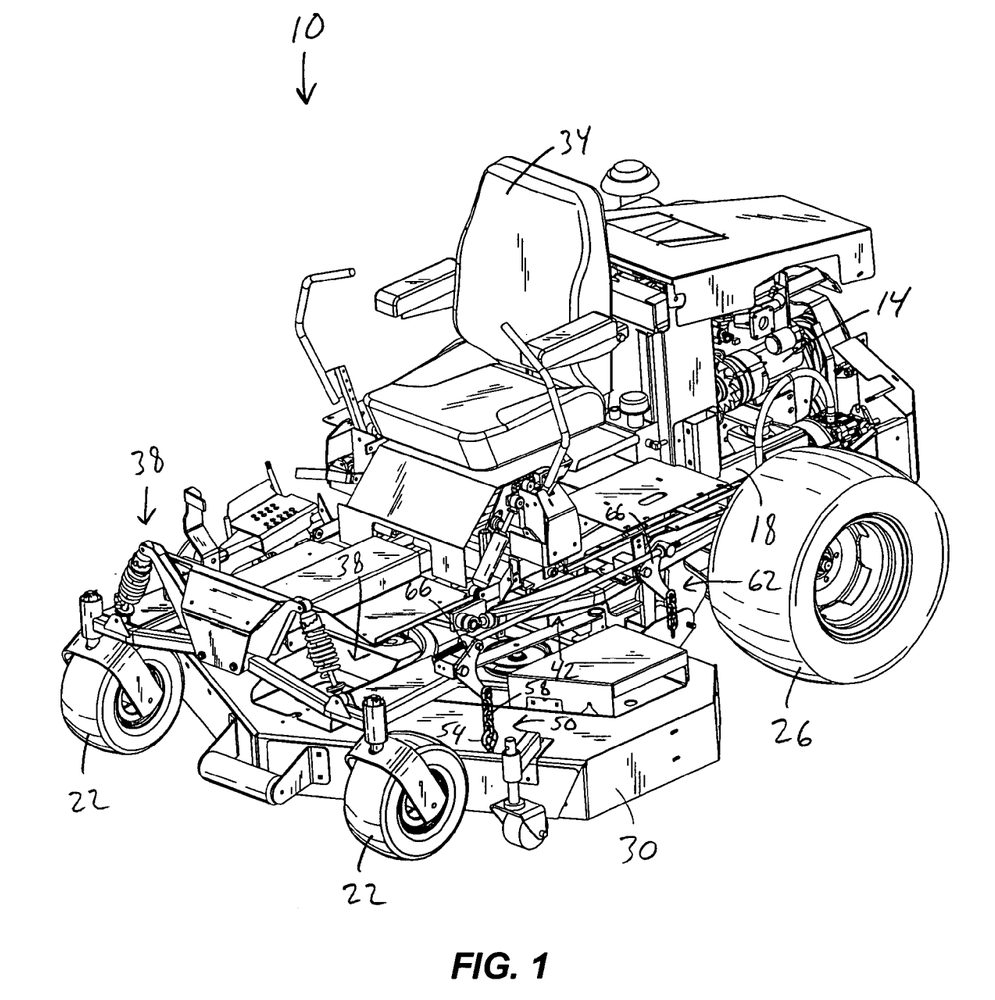
FIG. 1 is a front perspective view of a mower according to an embodiment of the present invention.
Figure 2:
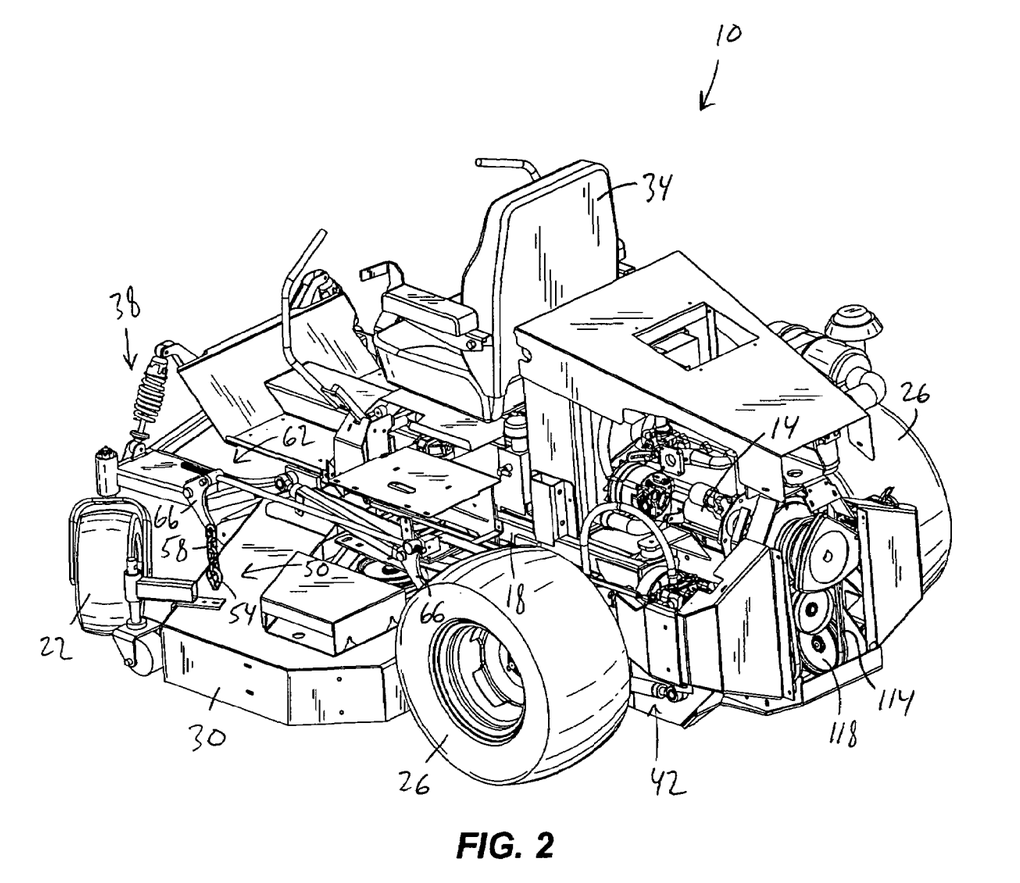
FIG. 2 is a rear perspective view of the mower of FIG. 1.

FIGS. 1 and 2 illustrate a mower 10 embodying one embodiment of the present invention. The mower 10 includes an engine 14, a frame 18, a pair of front wheels 22, a pair of rear wheels 26, a cutter deck 30, a seat 34, a pair of front wheel independent suspension assemblies 38, and a rear wheel suspension assembly 42. The particular type of mower 10 illustrated in FIGS. 1 and 2 is presented by way of example only. In this regard, other embodiments of the mower 10 can use different configurations of the front wheel independent suspension assemblies 38 and the rear wheel suspension assembly 42. Yet other embodiments of the mower can employ either the front wheel independent suspension assemblies or the rear wheel suspension assembly, or neither of the suspension assemblies. Other embodiments of the mower can employ rear wheel independent suspension assemblies.

The cutter deck 30 of the lawn mower can be located in many different orientations with respect to the front and rear wheels 22, 26 and with respect to the frame 18. However, in the embodiment illustrated in FIGS. 1 and 2, the cutter deck 30 is positioned between the front and rear wheels 22, 26. The cutter deck 30 contains at least one rotatable cutter 46a, 46b, 46c (see FIGS. 9 and 10) for cutting grass or other vegetation on a surface, and in some embodiments can be raised and lowered with respect to the ground.

The cutter deck 30 can be a floating or ground-following cutter deck 30. The cutter deck 30 according to the present invention can be directly or indirectly connected to the frame 18 of the mower 10 in a number of different manners, some of which provide different types of cutter deck movement and cutter deck performance. For example, the cutter deck 30 can be suspended entirely from the frame 18 of the mower 10, can be suspended at the front and rear from front and rear suspension assemblies 38, 42, can be suspended from the front by front suspension assemblies 38 while being suspended from the rear by the frame 18 of the mower 10, or can be suspended from the rear by the rear suspension assembly 42 while being suspended from the front by the frame 18 of the mower 10.

As shown in FIGS. 1 and 2, the cutter deck 30 is coupled to and suspended from the front wheel independent suspension assemblies 38 and the rear wheel suspension assembly 42. Connection to the front wheel independent suspension assemblies 38 and the rear wheel suspension assembly 42 permits the cutter deck 30 to follow upward and downward movement of the front wheels 22 and the rear wheels 26, respectively, in response to changing terrain elevation, thereby maintaining the cutter deck 30 in a more stable relationship with respect to the ground even as the mower 10 traverses uneven terrain. Alternatively, the cutter deck 30 can be coupled only to the front wheel independent suspension assemblies 38, only to the rear wheel suspension assembly 42, or only to the frame 18.

The cutter deck 30 can be coupled to the respective suspension assemblies 38, 42 in any manner desired, such as by chains or cables, by links, hinges or joints, by conventional fasteners such as bolts, screws, rivets, hooks, clips, and the like. For example, in the embodiment illustrated in FIGS. 1 and 2, the cutter deck 30 is coupled to the front wheel independent suspension assemblies 38 and the rear wheel suspension assembly 42 via deck hanger assemblies 50 that include conventional fasteners such as, for example, eyebolts 54, that are used in conjunction with chains 58 to couple the cutter deck 30 to the front and the rear suspension assemblies 38, 42.

The deck hanger assemblies 50 can be coupled directly to the front and/or rear suspension assemblies 38, 42 (such as to arms, flanges, or other portions of the front and/or rear suspension assemblies 38, 42, within apertures in the front and/or rear suspension assemblies 38, 42, and the like), or can be indirectly coupled thereto by a cutter deck lifting assembly 62. For example, the deck hanger assemblies 50 are connected to bell cranks 66, arms, or other elements movable by a user to lift and lower the cutter deck 30 with respect to the ground. Such bell cranks 66, arms, and other elements can be lifted and lowered by levers, pedals, cranks, motors, hydraulic or pneumatic actuators, or by any other manual or powered device. Still other devices and elements for raising and lowering the cutter deck 30 are well known to those skilled in the art and are not therefore described further herein.

Figure 3:
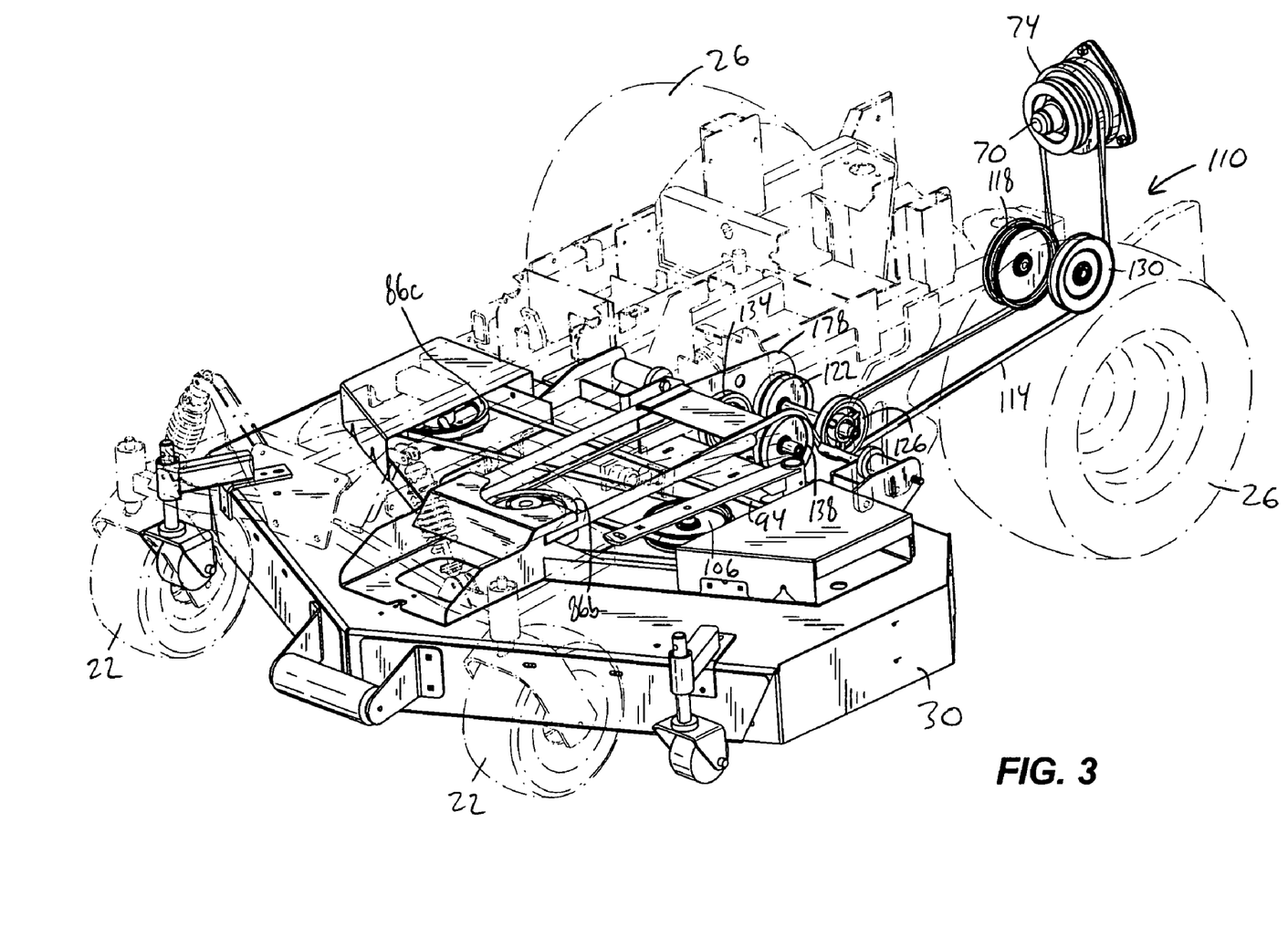
FIG. 3 is a front perspective view of the mower of FIG. 1, illustrating a cutter deck and a mule drive.
Figure 4:
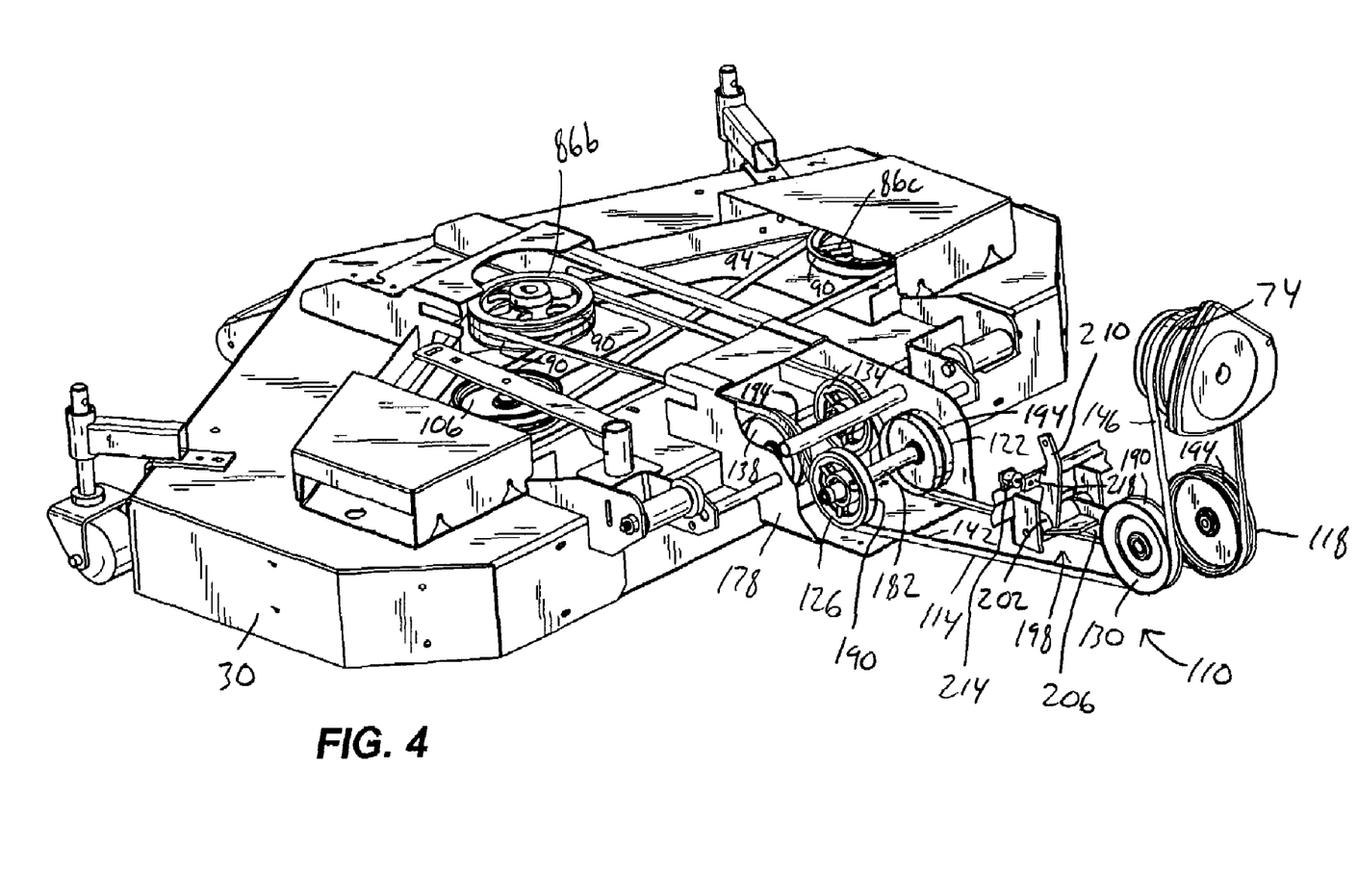
FIG. 4 is a rear perspective view of the mower of FIG. 1, illustrating the cutter deck and the mule drive.

The engine 14 is a horizontal shaft engine and includes a substantially horizontal output shaft 70 and an output or drive pulley 74 coupled to the output shaft 70 (see FIGS. 3 and 4). The output shaft 70 defines a substantially horizontal output axis 78 (see FIG. 5), and the drive pulley 74 rotates about the output axis 78 during operation of the engine 14. In the illustrated embodiment, the drive pulley 74 is drivably coupled to the output shaft 70 by an electric clutch. Alternatively, other known clutch devices or mechanisms can be used to drivably couple the drive pulley 74 and the output shaft 70. The drive pulley 74 can include at least one V-shaped groove (not shown) to receive a V-shaped continuous belt 114, which will be described in detail below.

Figure 5:
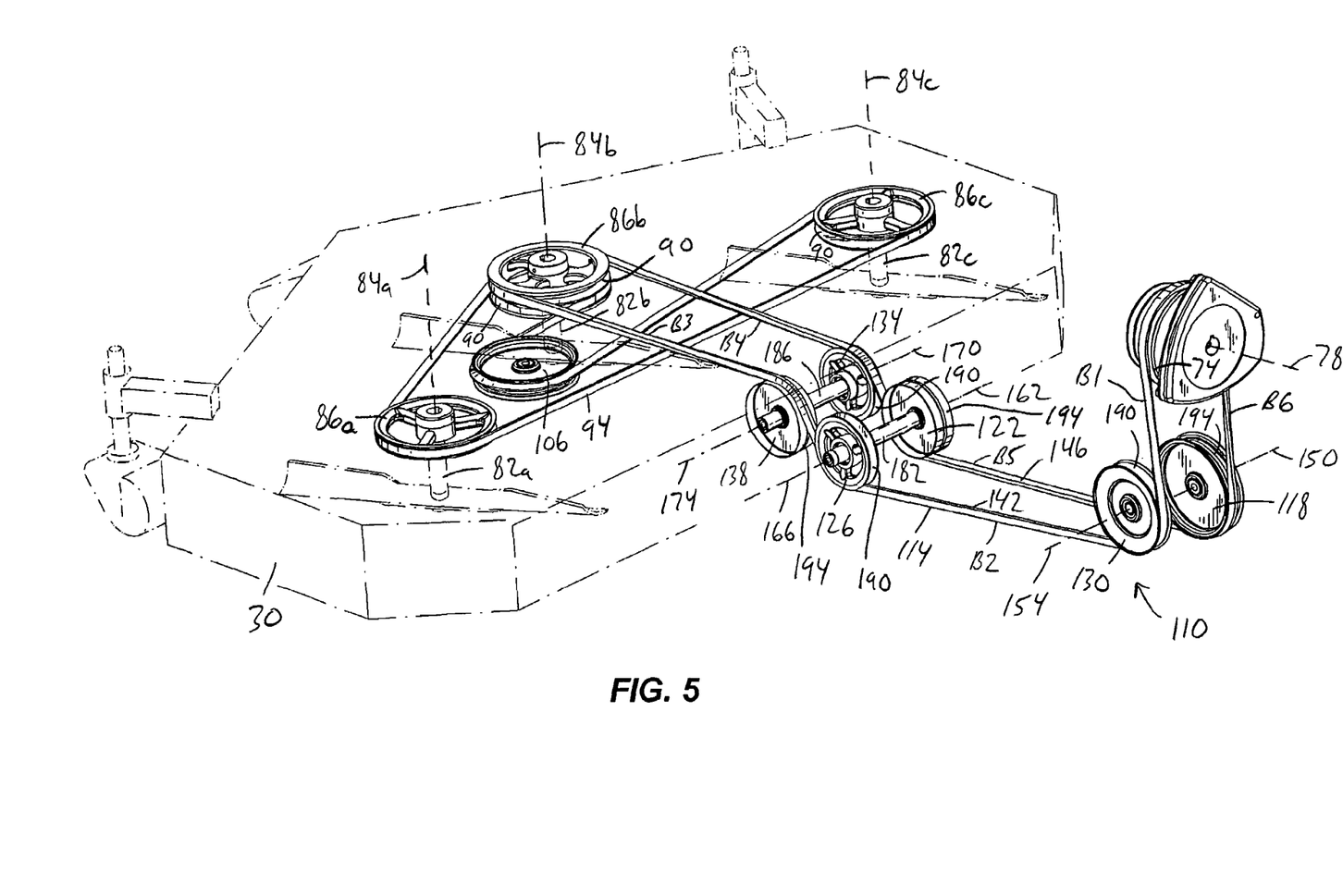
FIG. 5 is a rear perspective view of the components of the mule drive of the mower of FIG. 1.
Figure 6:
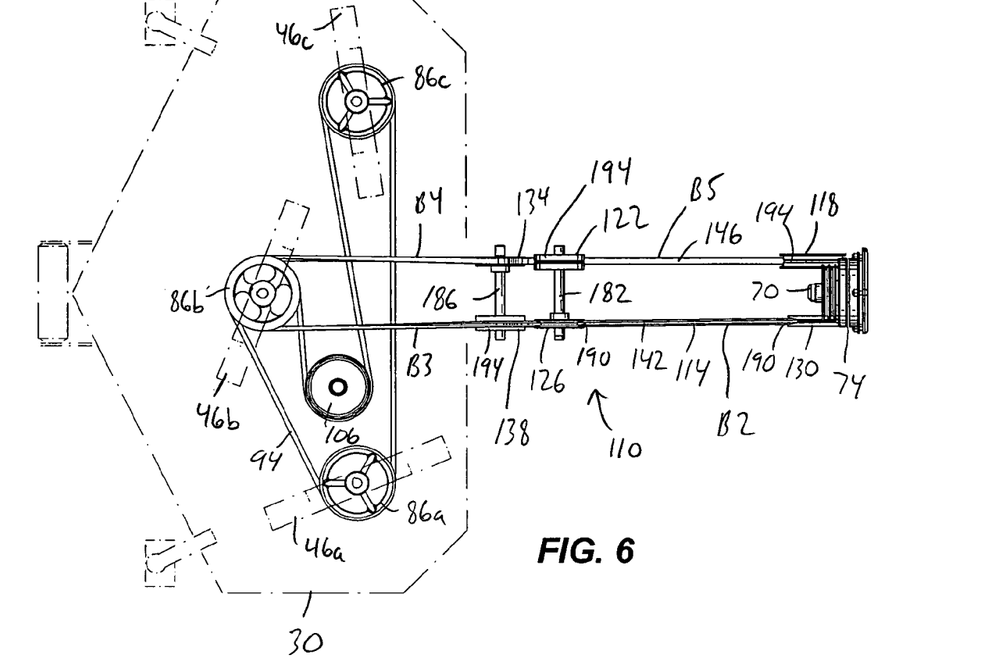
FIG. 6 is a top view of the components of the mule drive of the mower of FIG. 1.
Figure 7:
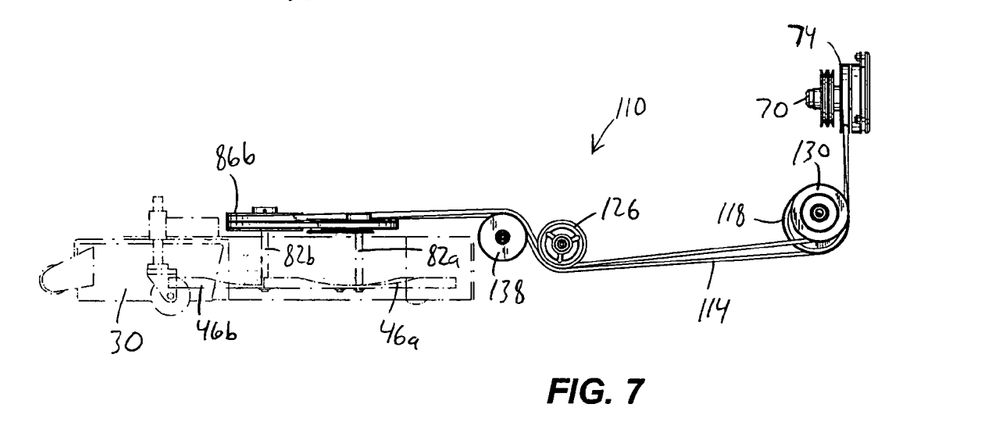
FIG. 7 is a side view of the components of the mule drive of the mower of FIG. 1.

FIGS. 5, 6, and 7 illustrate the cutter deck 30 including three rotatable cutters 46a, 46b, 46c driven by respective substantially vertical shafts 82a, 82b, 82c about substantially vertical axes 84a, 84b, 84c. Each of the shafts 82a, 82b, 82c is coupled to a respective driven pulley 86a, 86b, 86c that rotates about the substantially vertical axis 84a, 84b, 84c. Each of the driven pulleys 86a, 86b, 86c includes at least one V-shaped groove 90 to receive a V-shaped cutter drive belt 94. Specifically, the drive belt 94 includes a V-shaped portion and a substantially flat portion adjacent the V-shaped portion, whereby the V-shaped portion of the drive belt 94 engages or contacts the V-shaped grooves 90 of the driven pulleys 86a, 86b, 86c. The cutter deck 30 also includes a tensioner pulley 106 to maintain tension in the cutter drive belt 94.

One of the driven pulleys 86a, 86b, 86c includes two adjacent V-shaped grooves 90. In the illustrated embodiment, the middle cutter 46b includes the driven pulley 86b having the two adjacent V-shaped grooves 90. Alternatively, the pulley 86b having the two V-shaped grooves 90 can be coupled to any of the cutters 46a, 46b, 46c. One of the grooves 90 in the pulley 86b receives the cutter drive belt 94. In the illustrated embodiment, the lower groove 90 in the pulley 86b receives the cutter drive belt 94. In alternative embodiments, the upper groove 90 in the pulley 86b can receive the cutter drive belt 94.

As shown in FIGS. 3-7, a mule drive 110 drivably couples the driven pulley 86b with the drive pulley 74. In the illustrated embodiment, the mule drive 110 includes the single V-shaped continuous belt 114 and a plurality of idler pulleys 118, 122, 126, 130, 134, 138 guiding or redirecting the belt 114 between the drive pulley 74 and the driven pulley 86b. The belt 114 also includes a V-shaped portion 142 and a substantially flat portion 146 like the cutter drive belt 94. The upper groove 90 of the driven pulley 86b and the at least one V-shaped groove in the drive pulley 74 receives the V-shaped portion 142 of the belt 114 to transfer torque from the drive pulley 74 to the driven pulley 86b. From the driven pulley 86b, torque is transmitted to the cutters 46a, 46b, 46c through the cutter drive belt 94 and the respective vertical shafts 82a, 82b, 82c.

Figure 8:
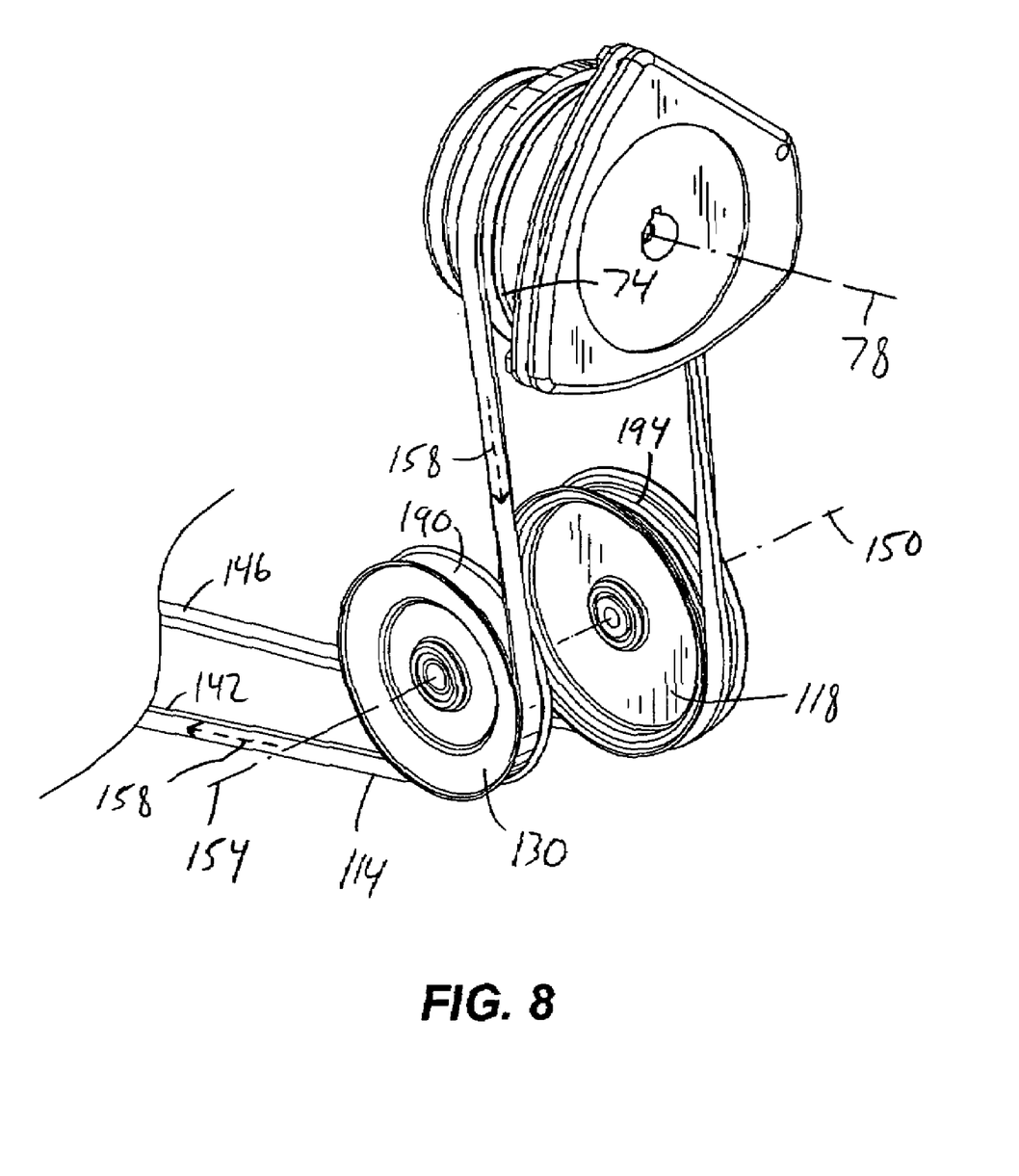
FIG. 8 is an enlarged view of a portion of the mule drive of the mower of FIG. 1.

As shown in FIGS. 3 and 4, pulleys 118, 130 are positioned adjacent the drive pulley 74 and are coupled to the frame 18 for rotation about respective axes 150, 154. In the illustrated embodiment, the axes 150, 154 are substantially transverse to both of the output axis 78 and the vertical axis 84b. As a result, the belt 114 changes orientation about a belt axis 158 (see FIG. 8) defined along the direction of travel of the belt 114 or along the length of the belt 114 as the belt 114 travels, for example, from the pulley 118 to the drive pulley 74, and from the drive pulley 74 to the pulley 130.

Pulleys 122, 126, 134, 138 are coupled to the cutter deck 30 for rotation about respective axes 162, 166, 170, 174. Each of the axes 162, 166, 170, 174 are substantially parallel to the axes 150, 154, such that the belt 114 can maintain a substantially constant orientation about the belt axis 158 as the belt 114 travels, for example, from the pulley 134 to the pulley 118, and from the pulley 130 to the pulley 138. Because the rotational axes 162, 166, 170, 174 of the respective pulleys 122, 126, 134, 138 are substantially parallel to the axes 150, 154, the axes 162, 166, 170, 174 are also substantially transverse to both of the output axis 78 and the vertical axis 84b. As a result, the belt 114 changes orientation about the belt axis 158 as the belt 114 travels, for example, from the driven pulley 86b to the pulley 134, and from the pulley 138 to the driven pulley 86b.

The pulleys 122, 126, 134, 138 are coupled to a bracket 178 which, in turn, is coupled to the cutter deck 30. In the illustrated embodiment, the rotational axes 162, 166 of the respective pulleys 122, 126 are coaxial with each other, and the rotational axes 170, 174 of the respective pulleys 134, 138 are coaxial with each other. The pulleys 122, 126 are coupled for rotation on a common shaft 182 to provide the coaxial rotational axes 162, 166. In some embodiments, the pulleys 122, 126 can be fixed to the common shaft 182, and the shaft 182 can be rotatably coupled to the bracket 178 by bushings, bearings, or other known components. In other embodiments, the common shaft 182 can be fixed to the bracket 178, and the pulleys 122, 126 can be rotatable relative to the shaft 182 using bushings, bearings, or other known components. In yet other embodiments, the pulleys 122, 126 can "float," or be individually movable or jointly movable along the axes 162, 166 to compensate for any variance in the relative position of the pulleys 134, 138 or the pulleys 118, 130.

Like the pulleys 122, 126, the pulleys 134, 138 are coupled for rotation on a common shaft 186 to provide the coaxial rotational axes 170, 174. In some embodiments, the pulleys 134, 138 can be fixed to the common shaft 186, and the shaft 186 can be rotatably coupled to the bracket 178 by bushings, bearings, or other known components. In other embodiments, the common shaft 186 can be fixed to the bracket 178, and the pulleys 134, 138 can be rotatable relative to the shaft 186 using bushings, bearings, or other known components. In yet other embodiments, the pulleys 134, 138 can "float," or be individually movable or jointly movable along the axes 170, 174 to compensate for any variance in the relative position of the pulleys 122, 126 or the pulleys 118, 130.

In the illustrated embodiment of the mule drive 110, the belt 114 twists about the belt axis 158 as the belt 114 travels between the drive pulley 74 and the driven pulley 86b. Further, the belt 114 can twist about the belt axis 158 such that either the V-shaped portion 142 of the belt 114 engages one or more of the pulleys 118, 122, 126, 130, 134, 138 or the substantially flat portion 146 of the belt 114 engages one or more of the pulleys (118, 122, 126, 130, 134, 138). Specifically, in the illustrated embodiment, the V-shaped portion 142 of the belt 114 engages the pulleys 126, 130, 134, while the substantially flat portion 146 of the belt 114 engages the pulleys 118, 122, 138. For the V-shaped portion 142 of the belt 114 to engage the pulleys 126, 130, 134, each of the pulleys 126, 130, 134 includes a V-shaped groove 190 to receive the V-shaped portion 142 of the belt 114. For the substantially flat portion 146 of the belt 114 to engage the pulleys 118, 122, 138, each of the pulleys 118, 122, 138 includes a substantially flat surface 194 upon which the substantially flat portion 146 of the belt 114 can ride. Other belt shapes can be used without departing from the invention.

With reference to FIG. 4, the mule drive 110 includes a belt tensioner 198 coupled to the pulley 130 to maintain tension in the belt 114 during operation of the mower 10 and cutter deck 30. In the illustrated embodiment, the belt tensioner 198 includes a bracket 202 coupling the pulley 130 to the frame 18. The bracket 202 includes a first lever 206 having the pulley 130 rotatably coupled thereto, and a second lever 210 oriented approximately 90 degrees from the first lever 206. The belt tensioner 198 also includes an adjustment screw 214 coupled to the frame 18. The adjustment screw 214 is aligned to contact a tab 218 extending from the second lever 210. The adjustment screw 214 can be extended to abut against the tab 218 and cause the bracket 202 to rotate in a clockwise direction, as viewed in FIG. 4. Rotation of the bracket 202 in this manner causes the pulley 130 to move in a downward direction to apply tension to the belt 114. Alternatively, the belt tensioner 198 can be configured in any of a number of different ways to position the pulley 130 to stretch or apply tension to the belt 114. Further, in alternative embodiments of the mule drive 110, the belt tensioner 198 can be coupled to any of the other pulleys 118, 122, 126, 134, 138 to maintain tension in the belt 114.

With reference to FIG. 5, the drive pulley 74 rotates in a counter-clockwise direction to drive the driven pulleys 86a, 86b, 86c and the cutters 46a, 46b, 46c in a clockwise direction. In alternative embodiments, the drive pulley 74 can rotate in a clockwise direction to drive the driven pulleys 86a, 86b, 86c in a counter-clockwise direction. In such embodiments, the cutters 46a, 46b, 46c can be configured accordingly to cut grass or other vegetation while rotating in a counter-clockwise direction.

In a belt run indicated by reference numeral B1, the belt 114 travels from the drive pulley 74 to the pulley 130. During the belt run B1, the belt 114 twists about 90 degrees in a counter-clockwise direction about the belt axis 158 as viewed along the belt axis 158 in the direction of travel of the belt 114. The V-shaped groove 190 in the pulley 130 receives the V-shaped portion 142 of the belt 114, and the pulley 130 redirects the belt 114 from a substantially vertical orientation to a substantially horizontal orientation.

The belt 114 then travels from the pulley 130 to the pulley 126 in a belt run indicated by reference numeral B2. During the belt run B2, the belt 114 substantially maintains a constant orientation about the belt axis 158, such that the V-shaped groove 190 in the pulley 126 receives the V-shaped portion 142 of the belt 114. From the pulley 126, the belt 114 is immediately transferred to the pulley 138 without twisting the belt 114 about the belt axis 158. As a result, the substantially flat portion 146 of the belt 114 engages or rides on the substantially flat surface 194 of the pulley 138.

The belt 114 then travels from the pulley 138 to the driven pulley 86b in a belt run indicated by reference numeral B3. During the belt run B3, the belt 114 twists about 90 degrees in a clockwise direction about the belt axis 158 as viewed along the belt axis 158 in the direction of travel of the belt 114. The V-shaped groove 90 in the driven pulley 86b receives the V-shaped portion 142 of the belt 114, and the driven pulley 86b redirects the belt 114 toward the drive pulley 74.

The belt 114 then travels from the driven pulley 86b to the pulley 134 in a belt run indicated by reference numeral B4. During the belt run B4, the belt 114 twists about 90 degrees in a clockwise direction about the belt axis 158 as viewed along the belt axis 158 in the direction of travel of the belt 114. The V-shaped groove 90 in the pulley 134 receives the V-shaped portion 142 of the belt 114, and the belt 114 is immediately transferred to the pulley 122 without twisting the belt 114 about the belt axis 158. As a result, the substantially flat portion 146 of the belt 114 engages or rides on the substantially flat surface 194 of the pulley 122.

The belt 114 then travels from the pulley 122 to the pulley 118 in a belt run indicated by reference numeral B5. During the belt run B5, the belt 114 substantially maintains a constant orientation about the belt axis 158, such that the substantially flat surface 194 on the pulley 118 receives the substantially flat portion 146 of the belt 114.

The belt 114 then travels back to the drive pulley 74 in a belt run indicated by reference numeral B6. During the belt run B6, the belt 114 twists about 90 degrees in a counter-clockwise direction about the belt axis 158 as viewed along the belt axis 158 in the direction of travel of the belt 114. The pulley 118 redirects the belt 114 from a substantially horizontal orientation to a substantially vertical orientation. The V-shaped groove in the drive pulley 74 receives the V-shaped portion 142 of the belt 114 to complete the path traveled by the belt 114.

The illustrated embodiment of the mule drive 110 shows one example sequence of twisting the belt 114 in about 90 degree increments in a counter-clockwise direction, a clockwise direction, a clockwise direction, and a counter-clockwise direction in belt runs B1, B3, B4, and B6, respectively. Since the number of clockwise belt twists is equal to the number of counter-clockwise belt twists, the belt 114 is properly oriented for continuous operation on the pulleys 74, 86b, 118, 122, 126, 130, 134, 138. However, alternative embodiments of the mule drive 110 can provide a different sequence of twisting the belt 114 in belt runs B1, B3, B4, and B6. For example, in one embodiment of the mule drive 110, the pulley 122 can be interchanged with the pulley 134, and the pulley 118 can be replaced by another V-shaped pulley 130. In such an embodiment, the belt 114 can twist 90 degrees clockwise in belt run B4 and 90 degrees clockwise in belt run B6, yielding an overall belt twist sequence of counter-clockwise, clockwise, counter-clockwise, and clockwise. Yet other embodiments of the mule drive 110 can yield different belt twist sequences in belt runs B1, B3, B4, and B6.

As shown in FIGS. 3-6, the arrangement of the pulleys 118, 122, 126, 130 does not require the belt 114 to twist about the belt axis 158 in belt runs B2 and B5. Such an arrangement of the pulleys 118, 122, 126, 130 increases the likelihood that the belt 114 will remain engaged with the pulleys 118, 122, 126, 130 upon upward and downward movement of the cutter deck 30 relative to the frame 18.

In an alternative embodiment of the mule drive 110, the pulleys 118, 130 can be omitted, and the bracket 178 supporting the pulleys 122, 126, 134, 138 can be extended toward the drive pulley 74 such that the belt 114 can travel from the pulley 122 directly to the drive pulley 74, and from the drive pulley 74 directly to the pulley 126. The belt tensioner 198 can then be coupled to any of the pulleys 122, 126, 134, 138 to maintain tension in the belt 114. In other embodiments of the mule drive 110, the belt tensioner 198 can be coupled to the bracket 178 to allow the bracket 178 and the pulleys 122, 126, 134, 138 to pivot relative to the cutter deck 30.

Figure 9:
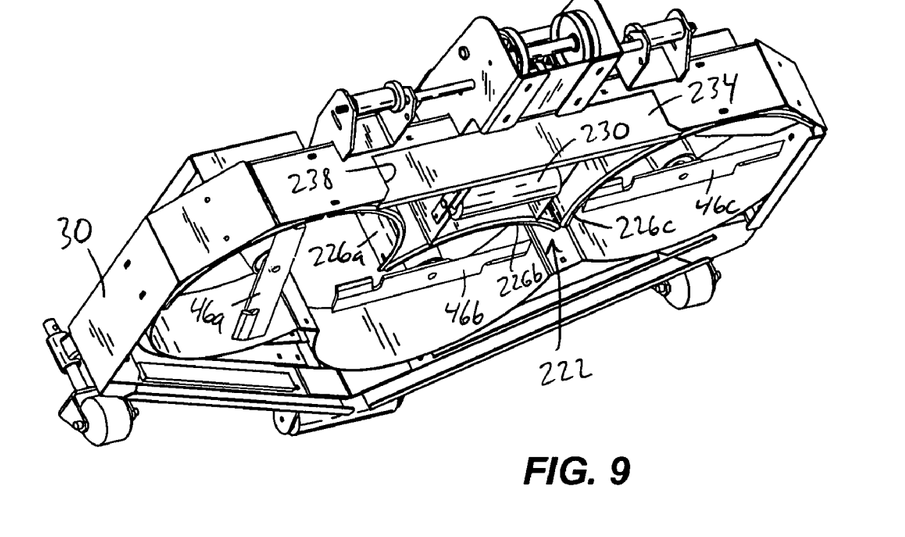
FIG. 9 is a bottom perspective view of the cutter deck of the mower of FIG. 1, illustrating a removable baffle installed in the cutter deck.
Figure 10:
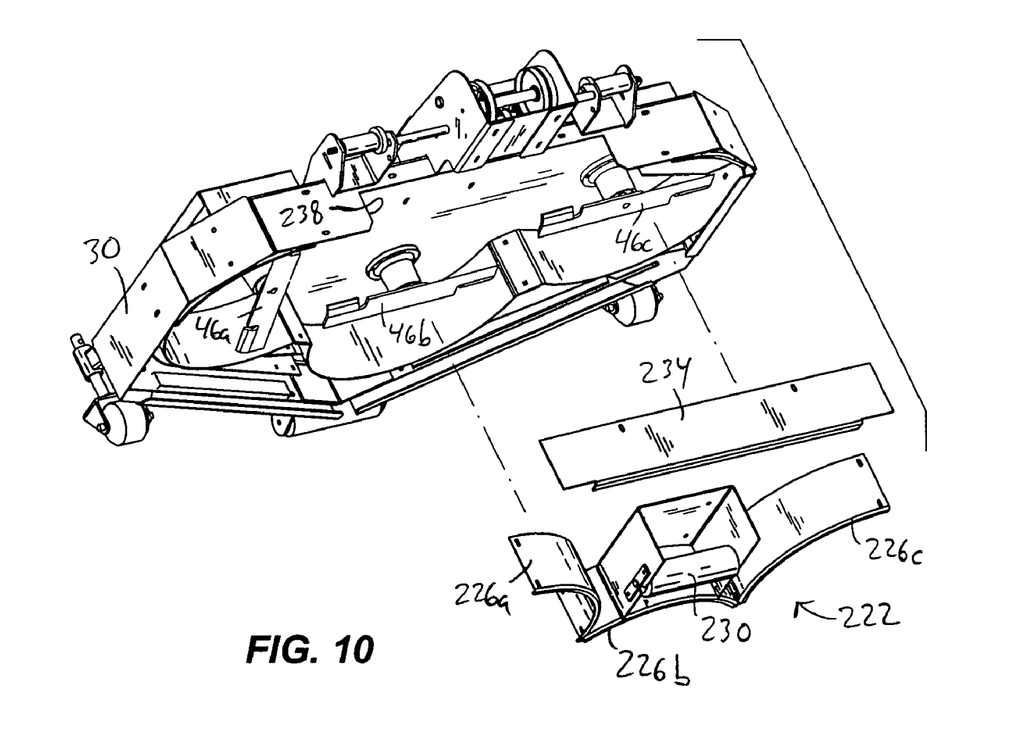
FIG. 10 is a bottom perspective view of the cutter deck of the mower of FIG. 1, illustrating the removable baffle exploded from the cutter deck.

FIGS. 9 and 10 illustrate a bottom view of the cutter deck 30 and the rotatable cutters 46a, 46b, 46c. In some embodiments of the cutter deck 30, a removable baffle 222 can be incorporated with the cutter deck 30. In some embodiments, the baffle 222 can be fastened to the cutter deck 30 using conventional fasteners such as bolts, screws, rivets, hooks, clips, and the like. In yet other embodiments, quick-release fasteners can be used to couple the baffle 222 and the cutter deck 30 to allow for quick installation and removal of the baffle 222.

In the illustrated embodiment, the removable baffle 222 includes three walls 226a, 226b, 226c corresponding with the three cutters 46a, 46b, 46c. During operation of the mower 10, the walls 226a, 226b, 226c can act as guides or deflectors for grass clippings or other vegetation clippings to guide the clippings toward a discharge opening (not shown) in the side of the cutter deck 30. A discharge chute (not shown) can be coupled to the cutter deck 30 to at least partially shield the operator of the mower 30 from the clippings being discharged from the discharge opening in the side of the cutter deck 30.

The removable baffle 222 also includes a roller 230 to limit the downward movement of the rear of the cutter deck 30. As a result, unwanted scalping of the grass or other vegetation can be avoided or prevented. However, in some embodiments, the removable baffle 222 may not include the roller 230.

The removable baffle 222 further includes a rear wall 234 extending between the walls 226a, 226c. When the baffle 222 is installed in the cutter deck 30 (see FIG. 9), the rear wall 234 closes or blocks a discharge opening 238 in the rear of the cutter deck 30. As a result, clippings can only be discharged through the discharge opening in the side of the cutter deck 30. When the baffle 222 is removed from the cutter deck 30 (see FIG. 10), clippings can be discharged through the discharge opening 238 in the rear of the cutter deck 30 in addition to the discharge opening in the side of the cutter deck 30.

In some embodiments, a wall or panel can be coupled to the side of the cutter deck 30 to close or block the discharge opening in the side of the cutter deck 30. As a result, clippings can only be discharged through the discharge opening 238 in the rear of the cutter deck 30. Further, in other embodiments, both of the discharge openings can be closed or blocked by the side wall or panel and the baffle 222, respectively, to provide mulch on the grass or other vegetation being cut.

Various aspects of the present invention are set forth in the following claims.

I claim:

1. A mule drive for use with a mower having a substantially horizontally-disposed output shaft and an output pulley coupled to the output shaft, the mower including a cutter deck having at least one Rota table cutter driven by a substantially vertically-disposed driven shaft coupled to a driven pulley, the mule drive comprising:

a first idler pulley coupled to the mower for rotation about a first axis substantially transverse to the output shaft and the driven shaft;

a second idler pulley coupled to the cutter deck for rotation about a second axis substantially parallel to the first axis;

a third idler pulley coupled to the cutter deck for rotation about a third axis coaxial with the second axis, one of the second and third idler pulleys including a V-groove to receive a V-shaped portion of the belt, the other of the second and third idler pulleys including a substantially flat surface to receive a substantially flat portion of the belt;

a fourth idler pulley coupled to the mower for rotation about a fourth axis substantially transverse to the output shaft and the driven shaft; and a continuous belt coupling the output pulley, the idler pulleys, and the driven pulley.

2. The mule drive of claim 1, wherein the cutter deck is coupled to at least one wheel of the mower for upward and downward movement in response to upward and downward movement of the at least one wheel, and wherein the second and third idler pulleys move upward and downward with the cutter deck.

3. The mule drive of claim 1, further comprising a belt tensioned coupled to at least one of the idler pulleys to maintain tension in the belt.

4. The mule drive of claim 3, wherein the belt tensioned is coupled to at least one of the first and fourth idler pulleys.

5. The mule drive of claim 1, wherein one of the first and fourth idler pulleys includes a V-groove to receive a V-shaped portion of the belt, and wherein the other of the first and fourth idler pulleys includes a substantially flat surface to receive a substantially flat portion of the belt.

6. The mule drive of claim 1, wherein the belt defines a belt axis along a direction of travel of the belt, wherein the first idler pulley guides the belt from the output pulley toward the driven pulley, wherein the first idler pulley redirects the belt from a substantially vertical orientation to a substantially horizontal orientation, and wherein the belt at least partially twists about the belt axis between the output pulley and the first idler pulley.

7. The mule drive of claim 1, wherein the belt defines a belt axis along a direction of travel of the belt, wherein the second idler pulley guides the belt from the first idler pulley toward the driven pulley, and wherein the belt maintains a substantially constant orientation with respect to the belt axis between the first and second idler pulleys and at least partially twists about the belt axis between the second idler pulley and the driven pulley.

8. The mule drive of claim 1, wherein the belt defines a belt axis along a direction of travel of the belt, wherein the third idler pulley guides the belt from the driven pulley toward the output pulley, and wherein the belt at least partially twists about the belt axis between the driven pulley and the third idler pulley.

9. The mule drive of claim 1, wherein the belt defines a belt axis along a direction of travel of the belt, wherein the fourth idler pulley guides the belt from the third idler pulley toward the output pulley, wherein the fourth idler pulley redirects the belt from a substantially horizontal orientation to a substantially vertical orientation, and wherein the belt maintains a substantially constant orientation with respect to the belt axis between the third and fourth idler pulleys and at least partially twists about the belt axis between the fourth idler pulley and the output pulley.

10. A mule drive for use with a mower having a substantially horizontally-disposed output shaft and an output pulley coupled to the output shaft, the mower including a cutter deck having at least one rotatable cutter driven by a substantially vertically-disposed driven shaft coupled to a driven pulley, the mule drive comprising:

a first idler pulley coupled to the mower for rotation about a first axis substantially transverse to the output shaft and the driven shaft;

a second idler pulley coupled to the cutter deck for rotation about a second axis substantially parallel to the first axis;

a third idler pulley coupled to the cutter deck for rotation about a third axis substantially parallel to the second axis;

a fourth idler pulley coupled to the frame for rotation about a fourth axis substantially transverse to the output shaft and the driven shaft;

a continuous belt coupling the output pulley, the idler pulleys, and the driven pulley;

a fifth idler pulley coupled to the cutter deck for rotation about a fifth axis substantially parallel to the second axis, the fifth idler pulley being positioned adjacent the second idler pulley to receive the belt from the second idler pulley; and a sixth idler pulley coupled to the cutter deck for rotation about a sixth axis substantially parallel to the third axis, the sixth idler pulley being positioned adjacent the third idler pulley to guide the belt to the third idler pulley.

11. The mule drive of claim 10, wherein one of the fifth and sixth idler pulleys includes a V-groove to receive a V-shaped portion of the belt, and wherein the other of the fifth and sixth idler pulleys includes a substantially flat surface to receive a substantially flat portion of the belt.

12. The mule drive of claim 10, wherein the fifth and sixth axes are coaxial with each other.

13. A mule drive for use with a mower having a substantially horizontally-disposed output shaft and an output pulley coupled to the output shaft, the mower including a cutter deck having at least one rotatable cutter driven by a substantially vertically-disposed driven shaft coupled to a driven pulley, the mule drive comprising:

a continuous belt drivable coupling the driven pulley to the output pulley, the belt defining a belt axis along a direction of travel of the belt;

a first idler pulley coupled to the mower for guiding the belt from the output pulley toward the driven pulley, the first idler pulley redirecting the belt from a substantially vertical orientation to a substantially horizontal orientation and at least partially twisting the belt about the belt axis between the output pulley and the first idler pulley, the first idler pulley rotating about a first axis substantially transverse to the output shaft and the driven shaft;

a second idler pulley coupled to the cutter deck for guiding the belt from the first idler pulley toward the driven pulley, the belt maintaining a substantially constant orientation about the belt axis between the first and second idler pulleys and at least partially twisting about the belt axis between the second idler pulley and the driven pulley, the second idler pulley rotating about a second axis substantially parallel to the first axis;

a third idler pulley coupled to the cutter deck for guiding the belt from the driven pulley toward the output pulley, the belt at least partially twisting about the belt axis between the driven pulley and the third idler pulley, the third idler pulley rotating about a third axis substantially parallel to the second axis;

a fourth idler pulley coupled to the mower for guiding the belt from the third idler pulley toward the output pulley, the fourth idler pulley redirecting the belt from a substantially horizontal orientation to a substantially vertical orientation, the belt maintaining a substantially constant orientation about the belt axis between the third and fourth idler pulleys and at least partially twisting about the belt axis between the fourth idler pulley and the output pulley, the fourth idler pulley rotating about a fourth axis substantially transverse to the output shaft and the driven shaft;

a fifth idler pulley coupled to the cutter deck for rotation about a fifth axis substantially parallel to the second axis, the fifth idler pulley being positioned adjacent the second idler pulley to receive the belt from the second idler pulley; and a sixth idler pulley coupled to the cutter deck for rotation about a sixth axis substantially parallel to the third axis, the sixth idler pulley being positioned adjacent the third idler pulley to guide the belt to the third idler pulley.

14. The mule drive of claim 13, wherein the second and third axes are coaxial with each other.

15. The mule drive of claim 13, wherein one of the fifth and sixth idler pulleys includes a V-groove to receive a V-shaped portion of the belt, and wherein the other of the fifth and sixth idler pulleys includes a substantially flat surface to receive a substantially flat portion of the belt.

16. The mule drive of claim 13, wherein the fifth and sixth axes are coaxial with each other.

17. The mule drive of claim 13, wherein the cutter deck is coupled to at least one wheel of the mower for upward and downward movement in response to upward and downward movement of the at least one wheel, and wherein the second and third idler pulleys move upward and downward with the cutter deck.

18. The mule drive of claim 13, further comprising a belt tensioned coupled to at least one of the idler pulleys to maintain tension in the belt.

19. The mule drive of claim 18, wherein the belt tensioned is coupled to at least one of the first and fourth idler pulleys.

20. The mule drive of claim 13, wherein one of the first and fourth idler pulleys includes a V-groove to receive a V-shaped portion of the belt, and wherein the other of the first and fourth idler pulleys includes a substantially flat surface to receive a substantially flat portion of the belt.

21. The mule drive of claim 13, wherein one of the second and third idler pulleys includes a V-groove to receive a V-shaped portion of the belt, and wherein the other of the second and third idler pulleys includes a substantially flat surface to receive a substantially flat portion of the belt.

22. A mower comprising:
a frame defining a longitudinal axis;
an engine coupled to the frame and having an output shaft rotatable about an output axis substantially parallel with the longitudinal axis;
an output pulley coupled to the output shaft for rotation about the output axis;
a cutter deck having at least one Rota table cutter;
a driven pulley drivable coupled to the cutter for rotation about a substantially vertical axis substantially transverse to the output axis; and
a mule drive drivably coupling the driven pulley and the output pulley, the mule drive including
a first idler pulley coupled to the frame for rotation about a first axis substantially transverse to the output axis and the vertical axis;
a second idler pulley coupled to the cutter deck for rotation about a second axis substantially parallel to the first axis;
a third idler pulley coupled to the cutter deck for rotation about a third axis substantially parallel to the second axis;
a fourth idler pulley coupled to the frame for rotation about a fourth axis substantially transverse to the output axis and the vertical axis;
a continuous belt coupling the output pulley, the idler pulleys, and the driven pulley;
a fifth idler pulley coupled to the cutter deck for rotation about a fifth axis substantially parallel to the second axis, the fifth idler pulley being positioned adjacent the second idler pulley to receive the belt from the second idler pulley; and a sixth idler pulley coupled to the cutter deck for rotation about a sixth axis substantially parallel to the third axis, the sixth idler pulley being positioned adjacent the third idler pulley to guide the belt to the third idler pulley.

23. The mower of claim 22, further comprising at least one wheel coupled to the frame for upward and downward movement relative to the frame, wherein the cutter deck is coupled to the at least one wheel for upward and downward movement in response to upward and downward movement of the at least one wheel, and wherein the second and third idler pulleys move upward and downward with the cutter deck.

24. The mower of claim 22, further comprising a belt tensioner coupled to at least one of the idler pulleys to maintain tension in the belt.

25. The mower of claim 24, wherein the belt tensioner is coupled to at least one of the first and fourth idler pulleys.

26. The mower of claim 22, wherein one of the first and fourth idler pulleys includes a V-groove to receive a V-shaped portion of belt, and wherein the other of the first and fourth idler pulleys includes a substantially flat surface to receive a substantially flat portion of the belt.

27. The mower of claim 22, wherein one of the second and third idler pulleys includes a V-groove to receive a V-shaped portion of the belt, and wherein the other of the second and third idler pulleys includes a substantially flat surface to receive a substantially flat portion of the belt.

28. The mower of claim 22, wherein one of the fifth and sixth idler pulleys includes a V-groove to receive a V-shaped portion of the belt, and wherein the other of the fifth and sixth idler pulleys includes a substantially flat surface to receive a substantially flat portion of the belt.

29. The mower of claim 22, wherein the fifth and sixth axes are coaxial with each other.

30. The mower of claim 22, wherein the second and third axes are coaxial with each other.

31. The mower of claim 22, wherein the belt defines a belt axis along a direction of travel of the belt, wherein the first idler pulley guides the belt from the output pulley toward the driven pulley, wherein the first idler pulley redirects the belt from a substantially vertical orientation to a substantially horizontal orientation, and wherein the belt at least partially twists about the belt axis between the output pulley and the first idler pulley.

32. The mower of claim 22, wherein the belt defines a belt axis along a direction of travel of the belt, wherein the second idler pulley guides the belt from the first idler pulley toward the driven pulley, and wherein the belt maintains a substantially constant orientation with respect to the belt axis between the first and second idler pulleys and at least partially twists about the belt axis between the second idler pulley and the driven pulley.

33. The mower of claim 22, wherein the belt defines a belt axis along a direction of travel of the belt, wherein the third idler pulley guides the belt from the driven pulley toward the output pulley, and wherein the belt at least partially twists about the belt axis between the driven pulley and the third idler pulley.

34. The mower of claim 22, wherein the belt defines a belt axis along a direction of travel of the belt, wherein the fourth idler pulley guides the belt from the third idler pulley toward the output pulley, wherein the fourth idler pulley redirects the belt from a substantially horizontal orientation to a substantially vertical orientation, and wherein the belt maintains a substantially constant orientation with respect to the belt axis between the third and fourth idler pulleys and at least partially twists about the belt axis between the fourth idler pulley and the output pulley.

* * * * *